US011586838B2

(12) United States Patent
He et al.

(10) Patent No.: US 11,586,838 B2
(45) Date of Patent: Feb. 21, 2023

(54) END-TO-END FUZZY ENTITY MATCHING

(71) Applicant: Microsoft Technology Licensing, LLC, Redmond, WA (US)

(72) Inventors: Yeye He, Redmond, WA (US); Chen Zhao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 781 days.

(21) Appl. No.: 16/460,271

(22) Filed: Jul. 2, 2019

(65) Prior Publication Data
US 2020/0272845 A1 Aug. 27, 2020

Related U.S. Application Data

(60) Provisional application No. 62/808,669, filed on Feb. 21, 2019.

(51) Int. Cl.
*G06K 9/62* (2022.01)
*G06F 17/18* (2006.01)
*G06N 7/02* (2006.01)
*G06N 20/00* (2019.01)

(52) U.S. Cl.
CPC ........... *G06K 9/6201* (2013.01); *G06F 17/18* (2013.01); *G06N 7/02* (2013.01); *G06N 20/00* (2019.01)

(58) Field of Classification Search
CPC ........ G06K 9/6201; G06N 20/00; G06N 7/02; G06F 17/18
See application file for complete search history.

(56) References Cited

U.S. PATENT DOCUMENTS

| 8,311,967 B1 | 11/2012 | Lin et al. |
| 10,606,846 B2 * | 3/2020 | Li .................... G06N 7/005 |
| 2013/0185314 A1 | 7/2013 | Rubinstein et al. |
| 2015/0235143 A1 | 8/2015 | Eder |

(Continued)

FOREIGN PATENT DOCUMENTS

CN 108875074 A * 11/2018 ............... G06N 3/04

OTHER PUBLICATIONS

"International Search Report and Written Opinion Issued in PCT Application No. PCT/US20/015511", dated Apr. 29, 2020, 13 Pages.

(Continued)

*Primary Examiner* — Scott C Anderson
(74) *Attorney, Agent, or Firm* — Schwegman Lundberg & Woessner, P.A.

(57) ABSTRACT

Systems and techniques for end-to-end fuzzy entity matching are described herein. A first input and a second input may be received. The first input and the second input may be evaluated to identify common attribute types. A set of attribute entity matching models may be selected that correspond to the attribute types. The first input and the second input may be evaluated using the set of attribute entity matching models to determine a set of weighted scores for attribute pairs in the first input and the second input. The set of weighted scores may be evaluated using a table-level entity matching model to identify a common entity included in the first input and the second input. A linking dataset may be generated that includes a cross-linking facility indicating a relationship between a first entity descriptor in the first input and a second entity descriptor in the second input.

20 Claims, 6 Drawing Sheets

(56) References Cited

U.S. PATENT DOCUMENTS

| | | | |
|---|---|---|---|
| 2018/0335309 A1* | 11/2018 | Pan | G01C 21/3453 |
| 2019/0180181 A1* | 6/2019 | Lilley | G06N 3/086 |
| 2019/0205318 A1* | 7/2019 | Tripathi | G06F 16/24578 |
| 2019/0318347 A1* | 10/2019 | Aguiar | G06N 20/00 |

OTHER PUBLICATIONS

Zhao et al., "Auto-EM: End-to-end Fuzzy Entity-Matching using Pre-trained Deep Models and Transfer Learning", In Proceedings of The World Wide Web Conference, May 13, 2019, pp. 2413-2424.

Aggarwal, et al., "A Survey of Text Classification Algorithms", In Publication of Springer, Jan. 7, 2012, pp. 163-222.

Arasu, et al., "Large-scale Deduplication with Constraints Using Dedupalog", In Proceedings of the IEEE International Conference on Data Engineering, Mar. 29, 2009, pp. 952-963.

Arasu, et al., "On Active Learning of Record Matching Packages", In Proceedings of the ACM SIGMOD International Conference on Management of Data, Jun. 6, 2010, pp. 783-794.

Bahdanau, et al., "Neural Machine Translation by Jointly Learning to Align and Translate", In Journal of Computing Research Repository, Sep. 2014, 15 Pages.

Bengio, Yoshua, "Deep Learning of Representations for Unsupervised and Transfer Learning", In Proceedings of ICML Workshop on Unsupervised and Transfer Learning, Jun. 27, 2012, pp. 17-37.

Bilenko, et al., "Adaptive Duplicate Detection Using Learnable String Similarity Measures", In Proceedings of ninth ACM SIGKDD international conference on Knowledge discovery and data mining, Aug. 24, 2003, 10 Pages.

Bowman, et al., "A large annotated corpus for learning natural language inference", In Proceedings of Conference on Empirical Methods in Natural Language Processing, Sep. 2015, 11 Pages.

Chaudhuri, et al., "Leveraging Aggregate Constraints for Deduplication", In Proceedings of ACM SIGMOD International Conference on Management of data, Jun. 12, 2007, pp. 437-448.

Chen, et al., "Enhanced LSTM for Natural Language Inference", In Proceedings of 55th Annual Meeting of the Association for Computational Linguistics, vol. 1, pp. 1657-1668, Jul. 30, 2017.

Christen, Peter, "Development and User Experiences of an Open Source Data Cleaning, Deduplication and Record Linkage System", In Proceedings of ACM SIGKDD Explorations Newsletter, vol. 11, Issue 1, Nov. 2009, pp. 39-48.

Chung, et al., "Supervised and Unsupervised Transfer Learning for Question Answering", In Proceedings of the Conference of the North American Chapter of the Association for Computational Linguistics: Human Language Technologies, Jun. 1, 2018, pp. 1585-1594.

Collobert, et al., "A Unified Architecture for Natural Language Processing: Deep Neural Networks with Multitask Learning", In Proceedings of 25th international conference on Machine learning, Jul. 5, 2008, pp. 160-167.

Cortez, et al., "Annotating Database Schemas to Help Enterprise Search", In Proceedings of VLDB Endowment, vol. 8, Issue 12, Aug. 2015, 4 Pages.

Dai, et al., "Semi-Supervised Sequence Learning", In Proceedings of Advances in neural information processing systems, Dec. 7, 2015, 9 Pages.

Dar, Pranav, "Top 10 Pretrained Models to get you Started with Deep Learning (Part 1—Computer Vision)", Retrieved from https://www.analyticsvidhya.com/blog/2018/07/top-10-pretrained-models-get-started-deep-learning-part-1-computer-vision/, Jul. 27, 2018, 18 Pages.

Devlin, et al., "Bert: Pre-Training of Deep Didirectional Transformers for Language Understanding", In Journal of Computing Research Repository, Oct. 2018, 16 Pages.

Doan, et al., "Semantic Integration Research in the Database Community: A brief Survey", In Publication of AI magazine, vol. 26, Issue 1, Mar. 15, 2005, pp. 83-94.

Dolan, et al., "Automatically Constructing a Corpus of Sentential Paraphrases", In Proceedings of Third International Workshop on Paraphrasing, Oct. 2005, 8 Pages.

Dong, et al., "Knowledge Vault: A Web-Scale Approach to Probabilistic Knowledge Fusion", In Proceedings of the 20th ACMSIGKDD International Conference on Knowledge Discovery and Data Mining, Aug. 24, 2014, 601-610.

Ebraheem, et al., "Distributed Representations of Tuples for Entity Resolution", In Journal of the VLDB Endowment, vol. 11, Issue 11, Jul. 2018, pp. 1454-1467.

Elmagarmid, et al., "Duplicate Record Detection: A survey", In Journal of IEEE Transactions on knowledge and data engineering, vol. 19, Issue 1, Jan. 2007, 16 Pages.

Gandica, et al., "Wikipedia Edition Dynamics", .arXiv:1412.8657v1 [physics.soc-ph] Dec. 30, 2014, 15 Pages.

Getoor, et al., "Entity Resolution: Theory, Practice & Open Challenges", In Proceedings of the VLDB Endowment, vol. 5, Issue 12, Aug. 27, 2012, pp. 2018-2019.

Graves, et al., "Hybrid Speech Recognition with Deep Bidirectional LSTM", In Proceedings of IEEE Workshop on Automatic Speech Recognition and Understanding, Dec. 8, 2013, 6 Pages.

He, et al., "Pairwise Word Interaction Modeling with Deep Neural Networks for Semantic Similarity Measurement", In Proceedings of Conference of the North American Chapter of the Association for Computational Linguistics: Human Language Technologies, Jun. 12, 2016, pp. 937-948.

Howard, et al., "Universal Language Model Fine-Tuning For Text Classification", In Proceedings of 56th Annual Meeting of the Association for Computational Linguistics, vol. 1, Jul. 15, 2018, pp. 328-339.

Huang, et al., "Learning Deep Structured Semantic Models for Web Search Using Clickthrough Data", In Proceedings of the 22nd ACM International Conference on Conference on Information & Knowledge Management, Oct. 27, 2013, pp. 2333-2338.

Iyyer, et al., "Deep Unordered Composition Rivals Syntactic Methods for Text Classification", In Proceedings of the 53rd Annual Meeting of the Association for Computational Linguistics and the 7th International Joint Conference on Natural Language Processing, vol. 1, Jul. 2015, pp. 1681-1691.

Joulin, et al., "Bag of Tricks for Efficient Text Classification", In Journal of Computing Research Repository, Jul. 6, 2016, 5 Pages.

Kim, Yoon, "Convolutional Neural Networks for Sentence Classification", In Proceedings of Conference on Empirical Methods in Natural Language Processing, Oct. 25, 2014, pp. 1746-1751.

Kingma, et al., "Adam: A Method for Stochastic Optimization", In Journal of Computing Research Repository, Dec. 2014, 15 Pages.

Konda, et al., "Magellan: Toward Building Entity Matching Management Systems", In Proceedings of the VLDB Endowment, vol. 9, Issue 12, Aug. 2016, pp. 1197-1208.

Kopcke, et al., "Frameworks for Entity Matching: A comparison", In Journal of Data & Knowledge Engineering, vol. 69, Issue 2, Feb. 2010, 14 Pages.

Lan, et al., "Neural Network Models for Paraphrase Identification, Semantic Textual Similarity, Natural Language Inference, and Question Answering", In Proceedings of the 27th International Conference on Computational Linguistics, Aug. 2018, 14 Pages.

Le, et al., "Distributed Representations of Sentences and Documents", In Proceedings of the 31st International Conference on International Conference on Machine Learning, vol. 32, Jun. 22, 2014, 9 Pages.

Marcelino, et al., "A Hierarchical Deep Learning Natural Language Parser for Fashion", In Journal of Computing Research Repository, Jun. 2018, 7 Pages.

Mikolov, et al., "Distributed Representations of Words and Phrases and their Compositionality", In Proceedings of the 26th International Conference on Neural Information Processing Systems, vol. 2, Dec. 5, 2013, 9 Pages.

Mudgal, et al., "Deep Learning for Entity Matching: A Design Space Exploration", In Proceedings of the International Conference on Management of Data, Jun. 10, 2018, pp. 19-34.

Nickel, et al., "A Review of Relational Machine Learning for Knowledge Graphs", arXiv:1503.00759v3 [stat.ML] Sep. 28, 2015, pp. 1-23.

(56) References Cited

OTHER PUBLICATIONS

Palangi, et al., "Deep sentence embedding using long short-term memory networks: Analysis and application to information retrieval", arXiv:1502.06922v3 [cs.CL] Jan. 16, 2016, pp. 1-25.

Pan, et al., "A Survey on Transfer Learning", In Proceedings of IEEE Transactions on Knowledge and Data Engineering, vol. 22, Issue 10, Oct. 2010, 1345-1359.

Parikh, et al., "A Decomposable Attention Model for Natural Language Inference", In Proceedings of the Conference on Empirical Methods in Natural Language Processing, Nov. 2016, pp. 2249-2255.

Paszke, et al., "Automatic differentiation in PyTorch", In Proceedings of 31st Conference on Neural Information Processing Systems, Dec. 4, 2017, 4 Pages.

Paulheim, Heiko, "Knowledge Graph Refinement: A Survey of Approaches and Evaluation Methods", In Journal of Semantic Web, vol. 8, Issue 3, Jan. 1, 2017, 23 Pages.

Pennington, et al., "GloVe: Global Vectors for Word Representation", In Proceedings of the Conference on Empirical Methods in Natural Language Processing, Oct. 25, 2014, pp. 1532-1543.

Qu, et al., "Named Entity Recognition for Novel Types by Transfer Learning", In Proceedings of the Conference on Empirical Methods in Natural Language Processing, Nov. 2016, pp. 899-905.

Radford, et al., "Improving Language Understanding by Generative Pre-Training", Retrieved from https://web.archive.org/web/20180731142036/https:/s3-us-west-2.amazonaws.com/openai-assets/research-covers/language-unsupervised/language_understanding_paper.pdf, Jul. 31, 2018, 12 Pages.

Sachan, et al., "Effective Use of Bidirectional Language Modeling for Transfer Learning in Biomedical Named Entity Recognition", In Proceedings of the Machine Learning for Healthcare Conference, Nov. 29, 2018, 19 Pages.

Sarawagi, et al., "Interactive Deduplication Using Active Learning", In Proceedings of the eighth ACM SIGKDD international conference on Knowledge discovery and data mining, Jul. 23, 2002, pp. 269-278.

Seo, et al., "Bidirectional Attention Flow for Machine Comprehension", arXiv:1611.01603v6 [cs.CL] Jun. 21, 2018, 13 Pages.

Shen, et al., "Constraint-Based Entity Matching", In Proceedings of the Twentieth National Conference on Artificial Intelligence, Jul. 9, 2005, 6 Pages.

Singhal, Amit, "Introducing the Knowledge Graph: Things, Not Strings", Retrieved from https://googleblog.blogspot.com/2012/05/introducing-knowledge-graph-things-not.html, May 16, 2012, 7 Pages.

Singla, et al., "Entity Resolution with Markov Logic", In Proceedings of the Sixth International Conference on Data Mining, Dec. 18, 2006, 11 Pages.

Stonebraker, et al., "Data Integration: The Current Status and the Way Forward", In Journal of IEEE Data Engineering Bulletin, vol. 41, Issue 2, Jun. 2018, pp. 3-9.

Vaswani, et al., "Attention Is All You Need", In Proceedings of Advances in Neural Information Processing Systems, Dec. 4, 2017, 11 Pages.

Whang, et al., "Generic Entity Resolution With Negative Rules", In VLDB Journal, vol. 18, Issue 6, Dec. 2009, 17 Pages.

Williams, et al., "A Broad-Coverage Challenge Corpus for Sentence Understanding through Inference", In Proceedings of the Conference of the North American Chapter of the Association for Computational Linguistics: Human Language Technologies, vol. 1, Jun. 1, 2018, 11 Pages.

Yang, et al., "Hierarchical Attention Networks for Document Classification", In Proceedings of the Conference of the North American Chapter of the Association for Computational Linguistics: Human Language Technologies, Jun. 12, 2016, pp. 1480-1489.

Yang, et al., "WIKIQA: A Challenge Dataset for Open-Domain Question Answering", In Proceedings of the Conference on Empirical Methods in Natural Language Processing, Sep. 17, 2015, pp. 2013-2018.

Gandica, et al., "Wikipedia editing dynamics", Physical Review E, vol. 91, 012824. 2015, 8 Pages.

\* cited by examiner

END-TO-END FUZZY ENTITY MATCHING

CLAIM OF PRIORITY

This patent application claims the benefit of priority to U.S. Provisional Patent Application Ser. No. 62/808,669, filed on Feb. 21, 2019, and titled "END-TO-END FUZZY ENTITY MATCHING," which is incorporated by reference in its entirety.

TECHNICAL FIELD

Embodiments described herein generally relate to computerized data entity matching and, in some embodiments, more specifically to end-to-end fuzzy entity matching using pre-trained deep models and transfer learning.

BACKGROUND

An entity may be the subject of a data set including attribute values. For example, a user of a system may be an entity and there may be several data sets that include attributes associated with the user. For example, an account data set may have attributes that include a username of the user, an address of the user, an email address of the user, etc. The attributes of the entity may be spread amongst a variety of data sources. It may be desirable to identify datasets corresponding to a same entity, referred to as a shared entity. For example, a user may desire to link an account associated in a customer resource management (CRM) system with an account in an enterprise resource planning (ERP) system. Linking the accounts may include determining a user account used for accessing the CRM system that corresponds to the same real person as an account used for accessing the ERP system.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
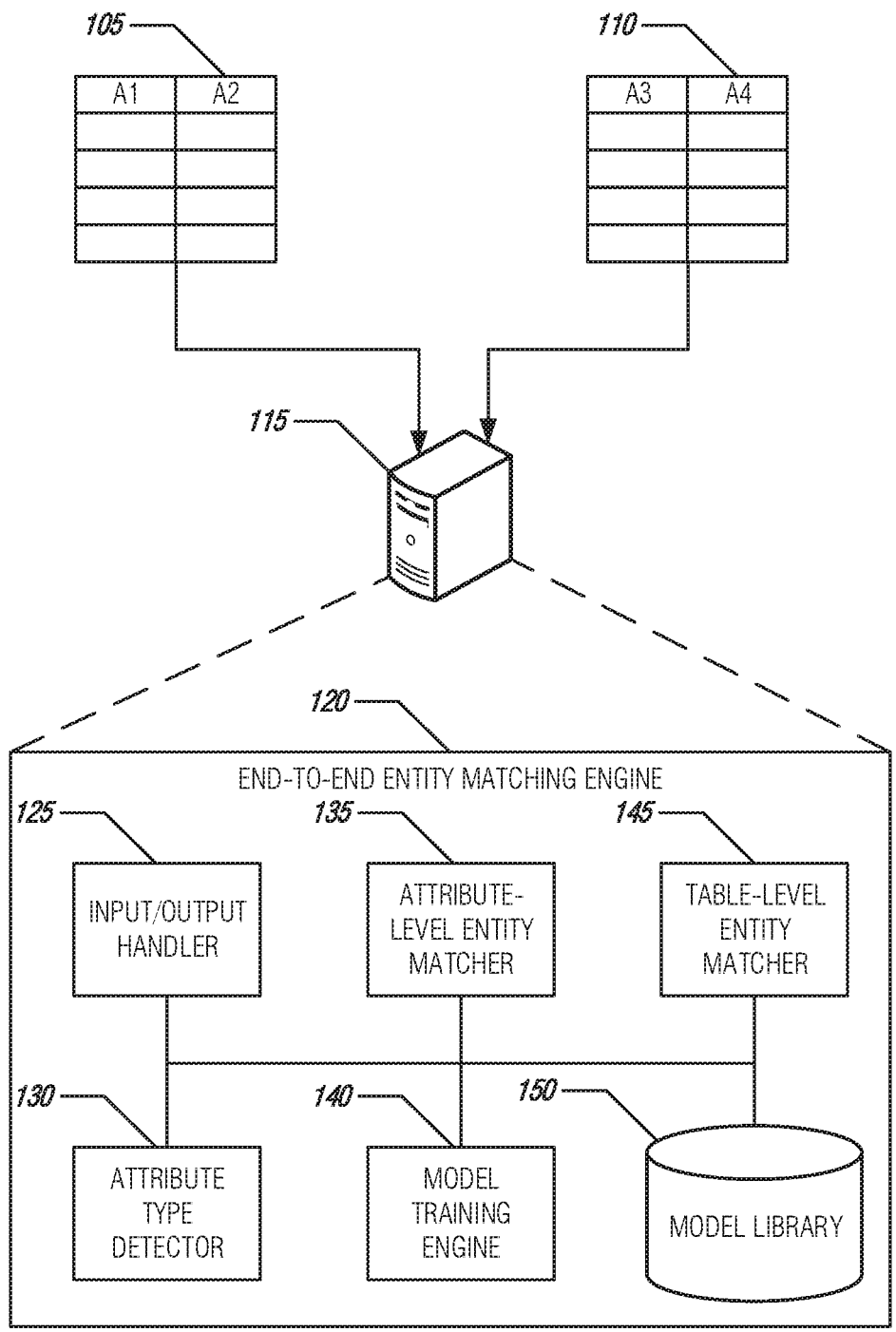
FIG. 1 is a block diagram of an example of an environment and a system for end-to-end fuzzy entity matching, according to an embodiment.

Entity matching (EM), also known as entity resolution, fuzzy join, and record linkage, refers to the process of identifying records corresponding to the same real-world entities from different data sources. It is an important and long-standing problem in data integration and data mining. Traditional techniques for EM focus on model improvement where better models are developed for more accurate predictions when a large amount of training data is available. In real-world applications these traditional approaches may require a large volume of labeled examples. This labeled training data may expensive to obtain in terms of processing time and money. The large volume of labeled training data required in traditional approaches to entity matching may extend training time for generating an EM model and may make the approach unfeasible where adequate training data does not exist.

"Entity-types" may be referenced in knowledge bases (KBs) and, as used herein, may refer to "columns" or "attributes" in tables. "Entity names" may be referenced in KBs and, as used herein, may refer to "attribute values" in tables. The respective terms may be used interchangeably in their corresponding contexts when appropriate.

The systems and techniques described herein use a transfer learning approach to EM that leverages pre-trained EM models from large-scale, production knowledge bases (KB). For each entity-type in a KB, (e.g., location, organization, people, etc.) rich synonymous names of known entities in the KB are used as training data to pre-train type-detection and EM models for each type using a hierarchical neural network architecture. Given a new EM task, with little or no training data, the pre-trained EM models may then be fine-tuned or may be leveraged directly leverage to build end-to-end, high-quality, EM systems. Experiments on a variety of EM tasks using real data suggest that the pre-trained approach is effective and outperforms existing EM methods.

EM has numerous important applications such as database deduplication, entity linking, knowledge base enrichment, etc. EM has been a long-standing problem in the areas of data mining and data integration. A typical EM task in a relational setting may be to predict which records from two tables correspond to the same real-world entities. EM in a graph setting, such as knowledge graphs, may be cast in a similar manner based on connected nodes.

TABLE 1

| T₁ | | | T₂ | |
|---|---|---|---|---|
| Name | Address | ↔ | Name | Address |
| Dave M. Smith | Seattle, WA | Yes | David Smith | Seattle, Washington |
| Joe White | Berkeley, CA | Yes | Joseph White | Berkeley, California |
| Sam A. Miller | Springfield, MA | No | Sam B. Miller | Springfield, Illinois |
| Mark Johnson | Bellevue, WA | No | Mary Johnson | Bellevue, Washington |

In Table 1, data set $T_1$ (e.g., a first table) and data set $T_2$ include Name and Address attributes for entities (e.g., people). Table 1 illustrates an example EM task. The task illustrated in Table 1 is a task to match records across two data sources that likely corresponding to the same person given two tables of customer records with information such as customer names and addresses.

In the example task, the first two pairs of records are likely matches despite their differences in string representations— "Joe White" and "Joseph White" likely refer to the same entity, so do "CA" and "California". However minor string differences are not sufficient to ensure matches. To the contrary, there are many record pairs that have minor differences but are clear non-matches. For example, in the last two pairs of records, "Sam A. Miller" and "Sam B. Miller" are likely not the same person, "Mark Johnson" and "Mary Johnson" are also unlikely to be the same person.

These match/non-match decisions are domain-specific and quite subtle, which are non-trivial to predict with high accuracy. Existing EM approaches, such as machine learning (ML)-based methods, may require a large amount of training data (e.g., labeled match/non-match pairs) for each new EM task, before accurate EM predictions may be made. It may be expensive and sometimes impossible to obtain a large amount of labeled data for each EM task.

In an example context of a commercial CRM (customer relationship management) system, where an enterprise using the CRM system may desire to automatically match their customer records across data silos in the enterprise (e.g., CRM, ERP, marketing, billing, customer-service, etc.), enabling EM across the data silos may allow the enterprise to establish a unified view of their customers allowing increased value by enabling personalized services (e.g., product recommendation, churn prediction, etc.).

The systems and techniques described herein for EM provide "self-service" and automatic EM that works accurately from instantiation with little or no training data specific to an enterprise (e.g., is not domain-specific).

Customer records in an enterprise may be scattered across non-standard database tables or comma separated value (CSV) files (e.g., data sets $T_1$ and $T_2$ in Table 1, etc.). The schema of these tables/files and the semantics of attributes may be heterogeneous and may not be known before a table is evaluated. Traditional EM approaches may not be able to be automated or may not provide accurate EM from instantiation because the traditional techniques may require a large amount of labeled training data for each EM task. Thus, the training data may need to be manually labeled and if there is insufficient training data available the EM results may be inaccurate until enough labeled training data has been accumulated.

While a vertical application such as CRM is used as an example, the end-to-end auto-EM systems and techniques described herein are applicable to other environments in which EM may be beneficial. For example, EM may be an important operator for general-purpose data processing platforms (e.g., record-deduplication, etc.).

Rather than re-training EM models from scratch for each new EM task, the systems and techniques described herein use a transfer-learning approach to EM using pre-trained models. While each EM task may be different in its own ways (e.g., tables may have different attributes, attributes have different importance, etc.), the types of attributes involved are often drawn from a set of common attributes (e.g., person-names, addresses, organizations, product-names, etc.). We observe that for each such attribute, the decision of match/non-match at the attribute-level can often be pre-trained and determined independent of the overall table-level EM task. For instance, in Table 1, for the person-name attribute type, it is rather unambiguous that ("Joe White", "Joseph White") should match, while ("Sam A. Miller", "Sam B. Miller") and ("Mark Johnson", "Mary Johnson") should not, irrespective of the overall table-level EM task involved.

Training data for these attribute-level match/non-match decisions may be readily available in KBs in the form of "synonymous/alias names" that have been curated for a large variety of entities (e.g., "Bill Gates" is also known as "William Gates" and "William H. Gates" in KBs). Data harvested from KBs may be leveraged to pre-train accurate attribute-level EM models for a variety of common attribute types. A hierarchical deep model architecture may be used for attribute-level EM to better capture complex structures in name variations for different types.

Using pre-trained attribute-level EM models, simple table-level EM tasks (e.g., ones involving only name matches with no additional attributes) may be automated with little human intervention (and without new training data).

For complex table-level EM tasks involving multiple relevant attributes (e.g., both name and address), the contribution/importance of individual attribute-level EM may vary. For instance, in Table 1, if the address-field of one table is "billing address" and the other is "mailing address," then a non-match on that attribute may not be as critical for the table-level decision. Using pre-trained attribute-level EM models and limited training data for each specific table-level EM task allows quick converge to accurate table-level EM decisions. The quick convergence is enabled by only needing to learn the relative importance of attributes for pre-trained types. In some examples, an attribute types in a data set may be unknown for which there is not a pre-trained attribute-level EM model. In the example, representations from unified pre-trained models may be fine-tuned via transfer-learning.

The auto-EM architecture is completed using automated attribute type detection in tables so that table-level EM evaluation may be completed without user intervention. This prevents the user from being prompted to find attribute correspondence between tables, select relevant attribute-level EM models, and combine them for a final table-level decision.

The systems and techniques described herein provide a variety of benefits over traditional EM techniques. Attribute-level signals may be combined in an end-to-end auto-EM architecture to quickly converge to an aggregate table-level EM decision with little or no training data by leveraging large-scale KB data and pre-training models for attribute type detection and attribute-level EM. A hierarchical deep model is generated to pre-train match/non-match decisions for common types of attributes. The hierarchical model leverages character-level and word-level information to better capture complex structures of name variations in different types of attributes. This approach to EM may produce better results than traditional EM techniques over diverse EM tasks while reducing the need for labeled training data.

FIG. 1 is a block diagram of an example of an environment 100 and a system 120 for end-to-end fuzzy entity matching, according to an embodiment. The environment may include a first data table 105 and a second data table 110. The first data table 105 and the second data table 110 may include attributes in columns that describe one or more entities (e.g., a person, an organization, an object, etc.). The tables may be obtained by a computing device 115 (e.g., a server, a cloud computing platform, a server cluster, a system on a chip (SoC), a field-programmable gate array (FPGA), an application-specific integrated circuit (ASIC), one or more of the foregoing in varying combinations, etc.). The computing device 115 may be communicatively coupled (e.g., running as software on, via wired network, wireless network, shared bus, cellular network, etc.) to the system 120. In an example, the system may be an end-to-end entity matching engine software residing in non-transitory machine-readable storage medium of the computing device 115 executed by at least one processor of the computing device 115.

The system 120 may include a variety of components including an input/output handler 125, an attribute type detector 130, an attribute-level entity matcher 135, a model training engine 140, a table-level entity matcher 145, and a model library 150. The components of the system 120 may be implemented on one or more computing devices such as computing device 115 and the input/output handler 125, the attribute type detector 130, the attribute-level entity matcher 135, the model training engine 140, the table-level entity matcher 145, and the model library 150 may be implemented on a single computing device or may be distributed across multiple computing devices.

The first table 105 and the second table 110 may be obtained by the system 120 via the input/output handler 125. For example, the first table 105 may be received via a customer relationship management (CRM) system communicatively coupled (e.g., via an application programmer interface (API), direct input mechanism, etc.) to system 120 and the second table may be received from an enterprise resource planning (ERP) system communicatively coupled to the system 120. The input/output handler 125 may receive the tables and may prepare (e.g., format, translate, manipulate, normalize, etc.) them for use as input for components of the system 120. The first table 105 may be a first input and the second table 110 may be a second input.

The attribute type detector 130 may evaluate the first input and the second input to identify common attribute types. For example, address and name columns may be identified in the first input and the second input. In an example, each attribute value of the first input and the second input may be processed using a hierarchical attribute-type detection model that includes a character evaluation layer and word evaluation layer. In an example, the hierarchical attribute-type detection model may include a bidirectional gated recurrent unit layer. The type detection models may be trained by the model training engine 140. Additional details of the training of and evaluation of inputs using the type detection models are provided in the description of FIG. 4. The type detection models may be stored in the model library 150.

The attribute-level entity matcher 135 may select a set of attribute entity matching models corresponding to the attribute types. For example, a name-type and an address-type attribute entity matching model may be selected for processing the name attributes and the address attribute, respectively. In an example, the set of attribute entity matching models may include one or more attribute-type specific attribute entity matching model. In another example, the set of attribute entity matching models may include a unified attribute entity matching model corresponding to an unknown attribute included in the common attribute types. For example, the first input and the second input may each have a column that cannot be identified as a known attribute type. A generalized unified model may be selected for evaluating the attributes for the unknown attribute types.

The attribute-level entity matcher 135 may evaluate the first input and the second input using the set of attribute entity matching models to determine a set of weighted scores for attribute pairs in the first input and the second input. For example, the scores may be based on a similarity between pairs of attributes in the first input and the second input. For example, a name attribute in the first input with a value of "John H. Smith" and a name attribute in the second input with a value of "Jonathan H. Smith" may receive a high score based on the closeness of the match and may be given a higher weight than a shipping address to billing address pair because matching values in name pairs may be assigned more importance.

The attribute entity matching models may be trained by the model training engine 140. Additional details of the training of and evaluation of inputs using the attribute entity matching models are provided in the description of FIG. 3. The attribute entity matching models may be stored in the model library 150.

The table-level entity matcher 145 may evaluate the set of weighted scores using a table-level entity matching model to identify a common entity included in the first input and the second input. In an example, a probability of a match between an entity in the first input and an entity in the second input may be calculated using the set of weighted scores and the common entity may be identified based on the probability of a match being outside a threshold. For example, the weighted scores may be used to generate an aggregate score for entity pairs in the first input and the second input. The aggregate score may be compared to a threshold value (e.g., a probability determined to be high enough to indicate the entities are a match, etc.) to determine if the entity pairs should be linked (e.g., identified as the same real-world entity, etc.). For example, based on the attribute-level weights and scores for John H. Smith in the first input and Jonathan H. Smith in the second input, the two entities may be linked as referring to the same real entity (e.g., the human Jonathan Hector Smith).

The input/output handler 125 may generate a linking dataset that includes a cross-linking facility that indicates a relationship between a first entity descriptor in the first input and a second entity descriptor in the second input. The linking dataset may be used to process transactions between data systems without making individual lookup calls to each data source to identify the attributes for the respective entities. The linking dataset may be a table, database, or other data structure that includes a reference to the first entity descriptor and the second entity descriptor. In an example, each entity in the linking dataset may include a globally unique identifier (GUID) and cross-linking facility may be a set of reference values that includes the first descriptor and the second descriptor. A system may access the linking dataset using the GUID, first descriptor, or the second descriptor and may be provided with the corresponding linked records and the system may use the linked dataset to access records for the entity in each of the linked tables without initiating a separate request to access each table.

In an example, the input/output handler 125 may generate a deduplicated data set based on the common entity. For example, matching attributes and corresponding values from each table may be combined into single records so that duplicate data is not maintained reducing data storage utilization and reducing future processing by minimizing the dataset. In some examples, the attributes and corresponding values may be deleted from one of the tables so that a single record of each attribute value is maintained. In another example, the recognition of a common entity in the tables may be used in managing access to the tables. For example, a single sign-on (SSO) system my record the entity identifiers from each table and may link the identifiers to a sign-on identifier that may provide access to resources based on an authentication request authenticated using the sign-on identifier.

Figure 2:
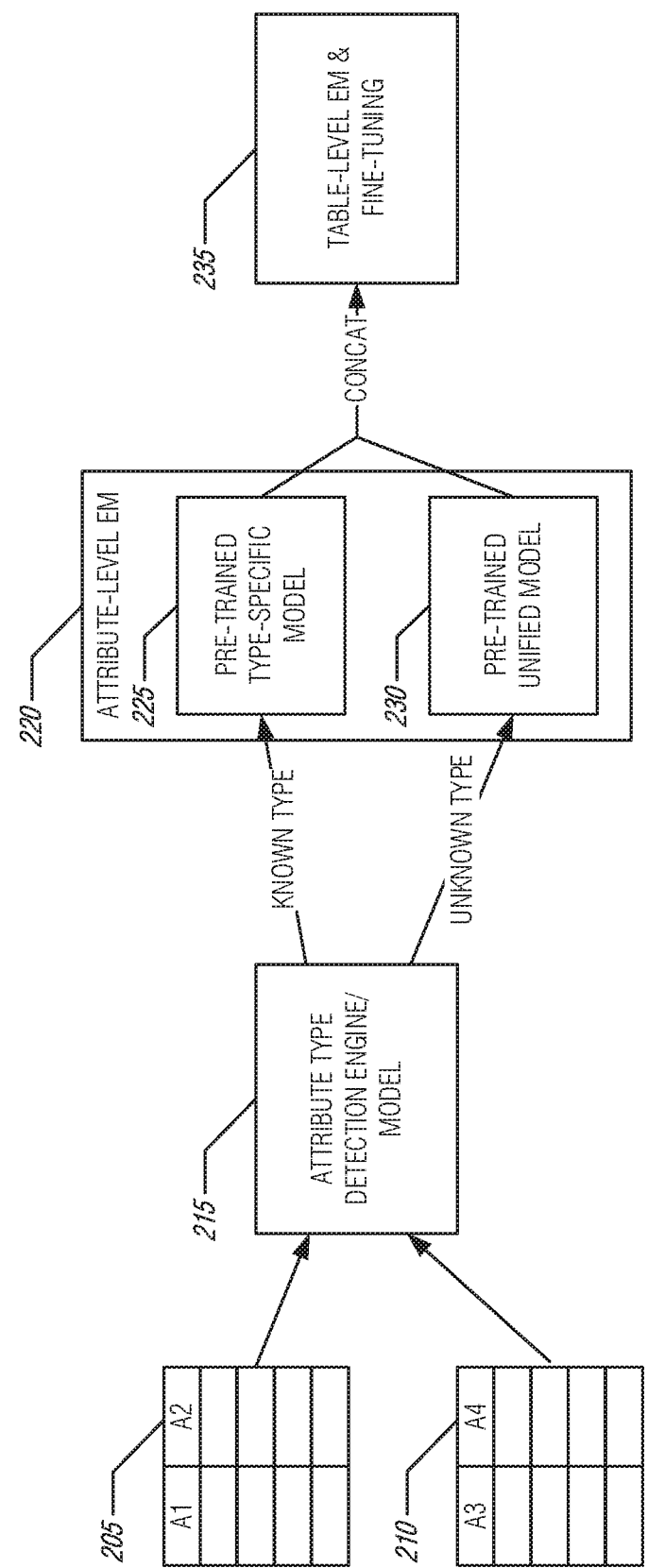
FIG. 2 is a block diagram of an example of a system architecture for end-to-end fuzzy entity matching, according to an embodiment.

FIG. 2 is a block diagram of an example of a system architecture 200 for end-to-end fuzzy entity matching, according to an embodiment. The system architecture 200 may be used to perform entity matching between two tables, a first table 205 (e.g., table $T_1$) and a second table 210 (e.g., table $T_2$), with n and m records, respectively, to determine for each record in the first table 205, if it matches with any record in the second table 210.

The system architecture 200 may include an attribute-type detection engine 215 (e.g., the attribute type detector 130 as described in FIG. 1, etc.), an attribute-level entity matching engine 220 (e.g., attribute-level entity matcher 135 as described in FIG. 1, etc.), and a table-level entity matching engine 235 (e.g., the table-level entity matcher 145 as described in FIG. 1). The attribute-level entity matching engine 220 may include a pre-trained type-specific model 225 and a pre-trained unified model 230. The table-level entity matching engine 235 may also fine-tune the pre-trained type-specific model 225 and the pre-trained unified model 230.

The attribute-type detection engine 215 may take a table as input and may predicts if each attribute (e.g., column, etc.) in the table corresponds to a known KB type T. In Table 1, for instance, the first column may be predicted as the KB type person, the second column as city, etc. Attribute-type detection models used to evaluate the attribute types may be pre-trained offline using rich KB data. For example, the KB data may be obtained from a commercial search engine. KBs used by commercial search engines may have millions of entities for hundreds of common types such as person, city, organization, book, movie, etc. This attribute-type data may be leveraged to train deep models to detect table column types. The attribute-type detection engine 215 is discussed in more detail in the description of FIG. 4.

The attribute-level entity matching engine 220 may take as input two entity values (e.g., "Dave M. Smith" and "David Smith" in Table 1, etc.) and may produce a score indicating a likelihood of a match between the two entity values. The attribute-level entity matching engine 220 may use two types of attribute-level EM models that may be pre-trained offline: (1) Type-specific models: For each known KB type T (e.g. person, etc.), a separate model may be pre-trained to predict match/non-match for values in T. For example, the pre-trained type-specific model 225 may be pre-trained to predict matches for a name attribute type. Synonymous entity names of type T in the KB (e.g., "Bill Gates" is also known as "William Gates", "William Henry Gates" and "William H. Gates", etc.) may be used as training data and to develop hierarchical deep models to learn name variations specific to each type T for accurate match/non-match decisions. (2) Unified model: This may be a single model (or multiple models) that predict match/non-match for attribute values for attribute types not in known in the KB. While the model architecture may be the same as the type-specific models, synonymous entity names taken from the union of many KB types may be used to pre-train a unified attribute-level EM (e.g., pre-trained unified model 230) that captures common name variations across different types (e.g., spelling variations, etc.). The pre-trained unified model 230 may be reasonably accurate and may be fine-tuned using limited training data to quickly fit a new type not known a priori.

As illustrated in FIG. 2, at online prediction time the attribute-level EM may take two possible paths using the two types of models based on type-detection results. For example, if the type of a pair of attributes are detected to be a known KB type T, the type-specific models for T (e.g., pre-trained type-specific model 225) may be used to evaluate the inputs for entity matching, otherwise the general-purpose unified model (e.g., the pre-trained unified model 230) may be used to evaluate the inputs for entity matching. The attribute-level entity matching engine 220 is discussed in more detail in the description of FIG. 3.

Each table-level EM task may be different (e.g., different attributes, different levels of importance for the same attributes, etc.). The table-level entity matching engine 235 takes as input concatenated outputs from the attribute-level entity matching engine 220 and may use limited training data to quickly converge to aggregate EM decisions. This approach may leverage pre-trained representations to fine-tune attribute-level EM for types that are not pre-trained (e.g., evaluated using the pre-trained unified model 230, etc.), using limited (e.g., a few dozen sets, etc.) training data to generate an attribute-type specific EM model.

Hierarchical deep models, such as, for example, the pre-trained type specific model 225, may be generated for the attribute-level entity matching engine 220. In an example, simplified versions of the hierarchical deep models may be used for attribute type-detection. The attribute-level entity matching engine 220 may take two attribute-values as input and may produce a score indicating a likelihood of a match between the two attribute-values. The likelihood of a match between the attribute values may be referred to as "similarity" between the attribute values.

In an example, a variety of head entity types (e.g., forty, etc.) may be selected from a KB that are deemed as common and useful for EM tasks (e.g., person, organization, city, book, etc.). In the KB each entity e may have an attribute called "alias" that may list alternative/synonymous names of e. For example, an entity "Bill Gates" may have aliases "William Henry Gates," "William H. Gates," etc. The alternative names may be useful to train type-specific attribute-level EM models such as the pre-trained type-specific model 225.

For positive examples, pairs of such alternative names may be used while filtering out pairs with no token overlap (e.g., no similar characters, words, etc.). The pairs that are listed as alternative names in the KB but with no token overlap may indicate semantic synonyms. For example, "Lady Gaga" may be an alias of "Stefani Joanne Angelina Germanotta." Such semantic synonyms are specific and are capable of cross-reference but may be difficult for EM models to generalize.

While aliases are used as an example, there are a variety of synonym ontologies used in various KBs. For example, "also-known-as," "foaf:nick," "means," "alternateName," and other synonym data feeds may provide similar synonymous data indicators for entity names in other KBs.

For negative examples, pairs of entities (e, e') in the KB may be used whose names have some syntactic similarity. For example, "Bill Gates" and "Bill Clinton" may be used as a pair of negative examples as they resolve to different KB entities, but also share a common token (e.g., Bill") in their names. Negative pairs that have syntactic similarity may be selected because if the pair are completely different, it is trivial to determine that they should not match (e.g., "Bill Gates" and "Larry Page"). Negative pairs with no token overlap may not be as helpful for models to learn to distinguish between positive and negative matches. Pairs of "highly similar" names may be generated that are informative as negative examples as follows: for each entity e, find the top-100 entities of the same type whose names are most similar to e. In an example, similarity to e may be decided based on a number of overlap tokens with e and then based on edit distance to break a tie.

In an example, for each canonical entity name from different types, on average 2 to 5 positive examples (e.g., synonym names) may be produced and 100 negative examples may be produced.

The KB may not curate long-form physical mailing addresses (e.g., "206 South Cross Street, Little Rock, Ark.," etc.). However, evaluating long-form physical mailing addresses may be a common EM task. In order to complement the KB for address data, query logs may be collected from a "Maps" vertical of a search engine to obtain variations of addresses (e.g., in ways that users would type them, etc.) and canonical addresses generated by the search engine. For example, a user query may be "206 South Cross Street, Little Rock, Ark." that may be mapped to canonical address "206 S Cross St, Little Rock, Ark. 72201" by the search engine. The address pairs may be collected as positive examples. Negative examples may be selected from highly-similar address pairs that resolve to different canonical addresses. In an example, training data for addresses may be generated in a variety of language locales (e.g., nine English-speaking locales (e.g. "en-us", "en-ca", "en-gb", "en-in", etc.)). The locale specific addresses may be used to train locale specific models for address as additional attribute types.

A variety of attribute-type specific models may be generated. For example, there may be forty-nine pre-trained EM models that is each specialized in evaluating one of forty-nine attribute-types. Obtaining training data is general and may be easily extended. For example, additional attribute types may be added from the KB, entity names in other languages from the KB may be used as additional types, etc. Many entities may be curated to have names in many different languages. The same may be true for addresses in other languages/locales.

Positive examples of matching entity names may exhibit complex structures and variations amongst the different attribute-types. A specific model architecture for attribute-level EM addresses these variations. (1) Subword/character-level matches may be important. For example, ("Dave Smith"="David Smith") and ("International Business Machine Corp"="IBM Corp") which may use character-level information in a name-type model for evaluating names. (2) Word-level pairs may be an important source of information. For example, ("Bill Gates"="William Gates"), ("William H. Gates"≠"William A. Gates"), and ("Mary Miller"≠"Mark Miller"), etc. While character-level models may capture some of these, for long names with many tokens it may be difficult for a model without word-level evaluation to perform accurate entity matching. Thus, the name-type model may include explicit word-level evaluation. (3) Within one input, different words/characters may have different importance. For example, ("IBM Inc."="IBM Corp.") because in the organization type, words like "Inc." and "Corp." may not important; but ("IBM Corp."≠"IBS Corp."). The same may be true for other types like person. Thus, an intra-input, self-attention-like mechanism may be used in the models to learn character/word importance. (4) Between two inputs, sometimes the word order may be different (e.g., "Dave Smith"="Smith, David") which may call for an alignment-like, inter-input attention mechanism between the two input strings in the models. This feature may be similar to attention used in machine-translation. The hierarchical-EM model (Hi-EM), shown in FIG. 3, addresses the variations among attribute-types.

Figure 3:
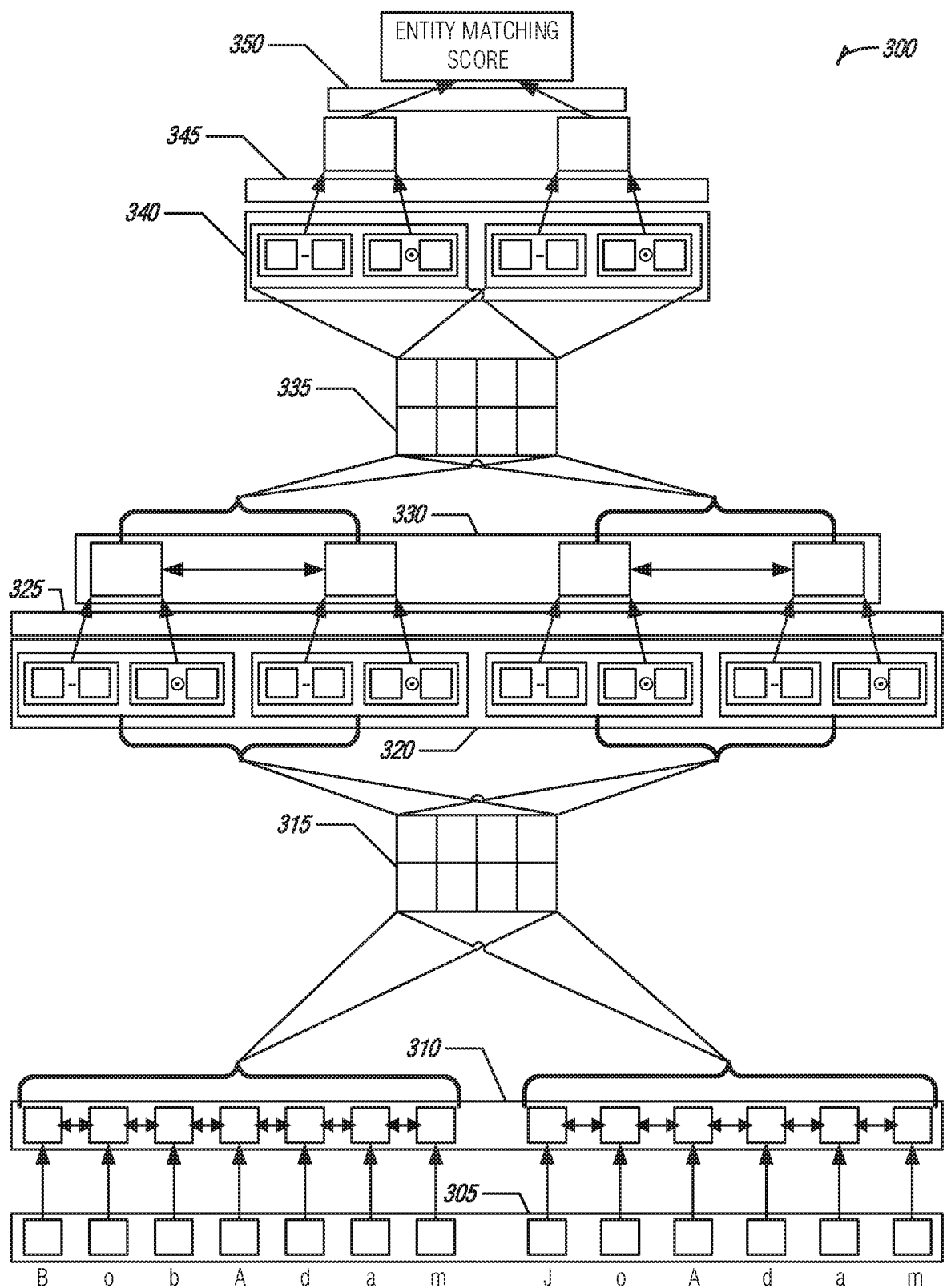
FIG. 3 illustrates an example of a hierarchical entity matching model for attribute-level entity matching in an end-to-end fuzzy entity matching system, according to an embodiment.

FIG. 3 illustrates an example of a hierarchical entity matching model 300 (Hi-EM) for attribute-level entity matching in an end-to-end fuzzy entity matching system, according to an embodiment. The 300 may provide features as discussed in FIGS. 1 and 2. In an example, the Hi-EM 300 may be used by the attribute-level entity matcher 135 as described in FIG. 1. In another example, the Hi-EM 300 may be used by the attribute-level entity matching engine 220 as described in FIG. 2. The Hi-EM 300 may be organized in a hierarchical structure in which input evaluation starts with character-level layers including a character embedding layer 305, a character Bidirectional-Gated-Recurrent-Unit (BiGRU) layer 310, a character inter-attention layer 315, a character aggregate layer 320, and a character intra-attention layer 325. Evaluation using the Hi-EM 300 then moves to upper-layers that may explicitly capture word-level information including a word BiGRU layer 330, a word inter-attention layer 335, a word aggregate layer 340, and a word intra-attention layer 345, The character-level layers capture fine-grained character-level variations and may address common out-of-vocabulary (OOV) issues for an attribute type. The word-level layers may explicitly leverage word-boundaries (e.g., separating characters in different words, etc.) which may be beneficial for evaluating long input strings. For example, data in attribute types like address may have five to ten words.

The character-level and word-level layers may include layers specifically designed for intra-input attention (e.g., within single input) (e.g., the character intra-attention layer 325 and word intra-attention layer 345), and inter-input attention (e.g., between two input strings) (e.g., the character inter-attention layer 315 and word inter-attention layer 335) which may enable the model to learn character/word importance and alignments between two input strings.

Characters in the input may be encoded and evaluated for alignment using attention before aggregation to produce word representations using the word-level layers. The character encoder may include the character embedding layer 305, and the character BiGRU layer 310. The character embedding layer 305, given a word $w_i$, $i \in [i, n]$, with its characters denoted as $c_{it}$, $t \in [1, l_i]$, embeds the characters to vectors through a character-embedding matrix $W_e$.

$$e_{it} = W_e * c_{it}$$

The embedded vectors $e_{it}$ are passed to a recurrent neural network (RNN) block to obtain contextual information of the characters. The character BiGRU layer 310 captures both forward and backward information. In an example, this may be similar to bidirectional long short-term memory (LSTM). The resulting character representation is denoted as $hc_{it}$.

$$hc_{it} = BiGRU_{(e_{it})}$$

For each character representation $hc_{it}$, the character inter-attention layer 315 may perform character alignment $hc_j$, $j \in [1, l]$, where l refers to the length of whole character sequence from the other input (e.g., the attribute from a second table, etc.). A bi-linear function is used with learned weight $W_c$ to get attention weights from the character sequence of the other input.

$$a_j = hc_{it} * W_c * hc_j$$

For each character position it, the character information from the other attribute is summarized as $$a_{it} = \Sigma_{j=1}^{l} a_j hc_j$$

For each character $c_{it}$, the character aggregate layer 320 produces a representation that is the concatenation of the element difference and multiplication between $hc_{it}$ and $a_{it}$.

$$pc_{it} = [|hc_{it} - a_{it}|; hc_{it} \circ a_{it}]$$

The character intra-attention layer 325 re-weights each combined character representation through a linear layer.

$$\beta_{it} = w_v * pc_{it}$$

A final representation for each word $r_i$ is a weighted average of character representation.

$$r_i = \Sigma_{t=1}^{l_i} \beta_{it} * pc_{it}$$

A word representation of each word is obtained from the two input strings, denoted as $r_i$, $i \in [1, n]$ and $r_j$, $j \in [1, m]$, where n, m are the total number words from the two input, respectively.

On top of the character-level layers that produce word-level representations, a set of word-level layers evaluate the word-level representations for overall attribute-value representations. These layers are designed similarly to include word encoding, inter-input attention, aggregation and finally intra-input attention, before producing a final representation for the full attribute value.

The word BiGRU layer 330 contextualizes each word representation $r_j$, $j \in [1, n]$.

$$hw_i = (r_i)$$

And the same $hw_j$ can be produced for $r_j$, $j \in [1, m]$.

The word inter-attention layer 335 incorporates alignment information with the other input string $hw_j$, $j \in [1, m]$.

$$a_j = hw_i * W_d * hw_j$$

$$a_i = \Sigma_{j=m}^{m} a_j hw_j$$

The word aggregate layer 340 concatenates the element difference and multiplication of the word representation and the aligned word representation.

$$pw_i = [|hw_i - a_i|; hw_i \circ a_i]$$

The word intra-attention layer 345 generates a final attribute-value representation z.

$$\beta_i = w_d * pw_i$$

$$z = \Sigma_{i=1}^{n} \beta_i * pw_i$$

The final representations of the two input strings are represented as $z_p$ and $z_q$, respectively.

The representation $z_p$, $z_q$ for a pair of attribute values (P, Q) are concatenated and then pass through a multi-layer perceptron (MLP) layer 350 to produce a final EM score.

$$score(P,Q) = MLP(z_p, z_q)$$

During training, logistic regression loss may be used that averages over all N examples as the loss function.

$$loss = \frac{1}{N} \Sigma \left( \Sigma_{pos} \left( \frac{1}{1 + e^{-score_{pos}}} \right) + \Sigma_{neg} \log \left( \frac{1}{1 + e^{score_{neg}}} \right) \right)$$

For each attribute type T, a separate attribute-level EM model may be trained that captures the specific characteristics in T (e.g., synonymous tokens, token importance, etc.) which may produce highly accurate match/non-match decisions for data in type T.

However, even though the attribute-level EM models are pre-trained for a large number of types, there may be attributes in EM tasks that are not known types. For unknown attribute types, transfer-learning may be used to quickly converge to a high-quality EM model when a new attribute type is not known a priori.

The union of data in known attribute types is used to build a general-purpose attribute-level EM model which may be referred to as a "unified-model." The unified model may capture common variations that are general across many attribute types (e.g., spelling variations, etc.). The unified model may serve as a starting model for training a new attribute type-specific model for a new attribute type. With limited training data for the new attribute-type, internal representations may be obtained from the unified-model (e.g., prior to the MLP layer 350) and new MLP layers may be added that may be fine-tuned using new training data to quickly converge to an EM model specific to the new attribute type. This transfer-learning produces high-quality models with limited training data.

For table level EM, a similar transfer-learning approach may be used. A type-specific attribute-level model or unified-model may be used to evaluate inputs based on table attribute types to obtain internal representations for each attribute pair. The representations are concatenated and an MLP layer is added at the end to evaluate the table-level EM inputs to determine if the attributes for the entity in each table are likely to represent the same entity. The model may be fine-tuned, end-to-end, using a small amount of table-level training data.

Figure 4:
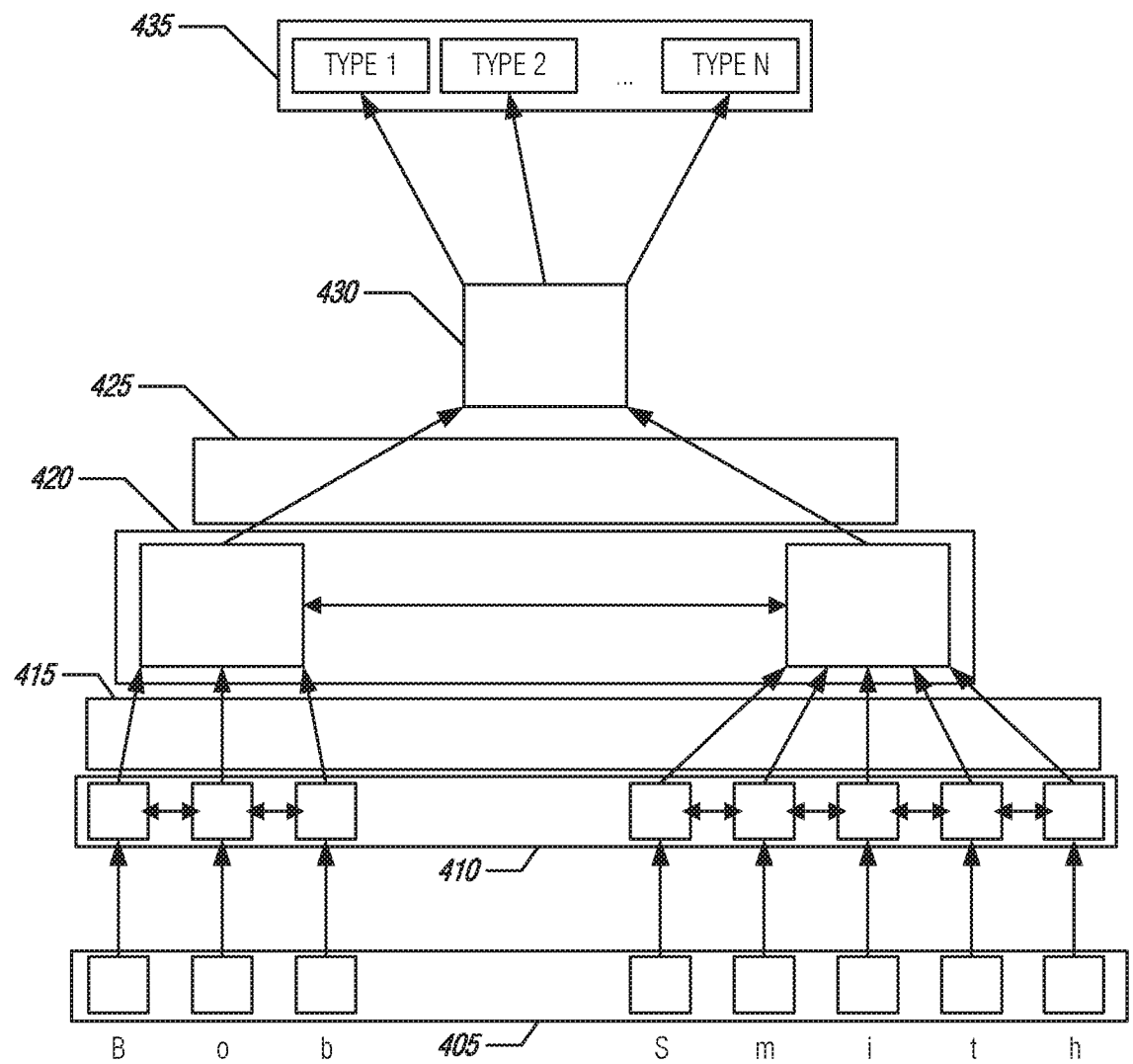
FIG. 4 illustrates an example of a hierarchical attribute-type model for attribute type detection in an end-to-end fuzzy entity matching system, according to an embodiment.

FIG. 4 illustrates an example of a hierarchical entity-typing model (Hei-ET) 400 for attribute type detection in an end-to-end fuzzy entity matching system, according to an embodiment. The Hei-ET 400 may provide features as described in FIGS. 1 and 2. In an example, the Hei-ET 400 may be used by the attribute type detector 130 as described in FIG. 1. In another example, the Hei-ET 400 may be used by the attribute-type detection engine 215 as described in FIG. 2. The Hei-ET 400 may detect whether each value from an input table column belongs to known attribute-types T. The Hei-ET 400 may include a variety of layers organized in a hierarchical structure including a character embedding layer 405, a character BiGRU layer 410, a character intra-attention layer 415, a word BiGRU layer 320, a word inter-attention layer 425, and an MLP layer 430. The Hei-ET may output determined attribute types 435 for received inputs (e.g., table values, etc.).

Training data used to train the Hei-ET 400 may be similar to the training data for the Hi-EM 300 described in FIG. 3. The training data may include a variety of common KB types and address types for type-detection. Each entity in the KB may be associated with one or more types. For example, entity "University of California" is of type "location", "organization", "educational institution", etc.; and entity "Harry Potter" is of type "written book", "film", "person", etc. Type-detection is formulated as a multi-hot classification problem because the type hierarchy in the KB is such that types are not mutually exclusive but partially overlapping and a string name may belong to multiple types. Thus, given an input string all types it belongs to are predicted.

For each type T, names of entities in T, or {e∈ T} are used as positive examples for training. For negative examples, initially entities from {e'∉ T} are used. However, this may be problematic because KB types may be incomplete. For instance, while "University of California" has both types "organization" and "educational institution", another (smaller) university "Gonzaga University" may only have type "educational institution" and not "organization" (e.g., is a missing type). Because of the missing type, "Gonzaga University" may be incorrectly used as a negative example for "organization" which may confuse the model and may lessen the accuracy of the evaluation results.

To address this issue, an approach to avoid selecting an entity e∈ $T_1$ as a negative example for $T_2$, if its known type $T_1$ has positive correlation with $T_2$ (e.g., "organization" and "educational institution") is used. For each pair of types $T_1$ and $T_2$, an entity-instance-level point-wise mutual information (PMI) is computed, defined as $$\frac{|\{e \mid e \in T_1, e \in T_2\}||\{e \in U\}|}{|e \in T_1||\{e \in T_2\}|},$$

where $\{e \in U\}$ is all the entities in the universe in the KB. If PMI>0, then $T_1$ and $T_2$ are likely correlated and overlapping types. For instance, there are a substantial number of instances belonging to both "educational institution" and "organization", resulting in a positive PMI score. As such, entity e of type "educational institution" is not used as a negative example of "organization" irrespective of whether e has type "organization". The negative examples of $T_1$ are expressed $\{e | e \notin T_1, \forall T_2 \ni e, \text{PMI}(T_1, T_2) < 0\}$.

The Hie-ET 400 follows a similar hierarchical structure as the Hi-EM 300 as shown in FIG. 3. Combining the type-detection task with the attribute-level EM task using multi-task learning may be possible given that there is some similarity between the tasks. However, the combination of the tasks may lower the accuracy of the model to perform each task. This is because the "importance" of tokens in these two tasks are opposites—to detect types for "University of California," the token "University" is more important, but for EM (e.g., compare to "University of Colorado"), "California" is actually more important. To address this issue, different models may be generated and trained for type-detection.

The Hie-ET 400 takes an input attribute value with n words $w_i$, $i \in [1, m]$, where each word contains $l_i$ characters, written as $c_{it}$, $t \in [1, l_i]$. It produces C binary labels $(0_1, \ldots o_c) \in \{0, 1\}^C$ for the C pre-trained types.

For each character $c_{it}$, $t \in [1, l_i]$, the character embedding layer 405 embeds the character into vectors $e_{it}$ using a character-embedding matrix $W_e$ and equation $e_{it} = W_e * c_{it}$.

The character BiGRU layer 410 obtains contextual character representation $hc_{it}$ using equation $hc_{it} = \text{BiGRU}_{(e_{it})}$.

Using $hc_{it}$, the character intra-attention layer 415 weights each contextual hidden state by importance using equation $\beta_{it} = w_c * pc_{it}$. Where $a_j = hc_{it} * W_c * hc_j$, $a_{it} = \Sigma_{j=1}^{l_i} a_j hc_j$, and $pc_{it} = [|hc_{it} - a_{it}|; hc_{it} \circ a_{it}]$. The final representation for each word $r_i$ is a weighted average of representation $hc_{it}$ using equation $r_i = \Sigma_{t=1}^{l_i} \beta_{it} * pc_{it}$.

For each word representation $r_i$, $i \in [1, n]$, word BiGRU layer 420 uses equation $hw_i = \text{BiGRU}(r_i)$ to compute contextual representation $hw_i$.

The word inter-attention layer 425 uses equation $\beta_i = w_d * pw_i$ to weight each contextual hidden state by importance. The final attribute representation z is a weighted average of word contextual representation $hw_i$ computed using equation $z = \Sigma_{i=1}^{n} \beta_i * pw_i$.

The representation z passes through the MLP layer 430. Each binary output may have its own MLP layer.

$$o_i = MLP_i(z), i \in [1, C]$$

The final output is the softmax of MLP output.

$$p_i = \text{softmax}(o_i)$$

Where $p_i = [p_{i0}, p_{i1}]$ indicates the probability of predicting the input value as the ith pre-trained type (e.g., attribute types 435) as true, and false, respectively.

During training, cross-entropy may be used as a loss function, the final loss is the average of C classes over all examples.

$$L = -\frac{1}{N}\frac{1}{C}\sum_{ex}\sum_{i=1}^{C} y_{i0}\log(p_{i0}) + y_{i1}\log(p_{i1})$$

The Hei-ET 300 may predict types for one input value at a time. When predicting types for a column of k values, an average score may be computed for the k values to produce a result.

Transfer-learning may be applied by directly using pre-trained type-detection models to detect if a table column/attribute corresponds to one of the known types. Similar to transfer-learning in attribute-level EM (e.g., as described in FIG. 3), type-detection models may be applied to new types by first building a unified-model which is trained using the union of data for several known types. For a new attribute type, training may begin from a representation of the unified-model and may use fine-tuning to produce an accurate model for a new type with little training data. Transfer-learning may converge to high-quality type-detection models faster than training from scratch.

Figure 5:
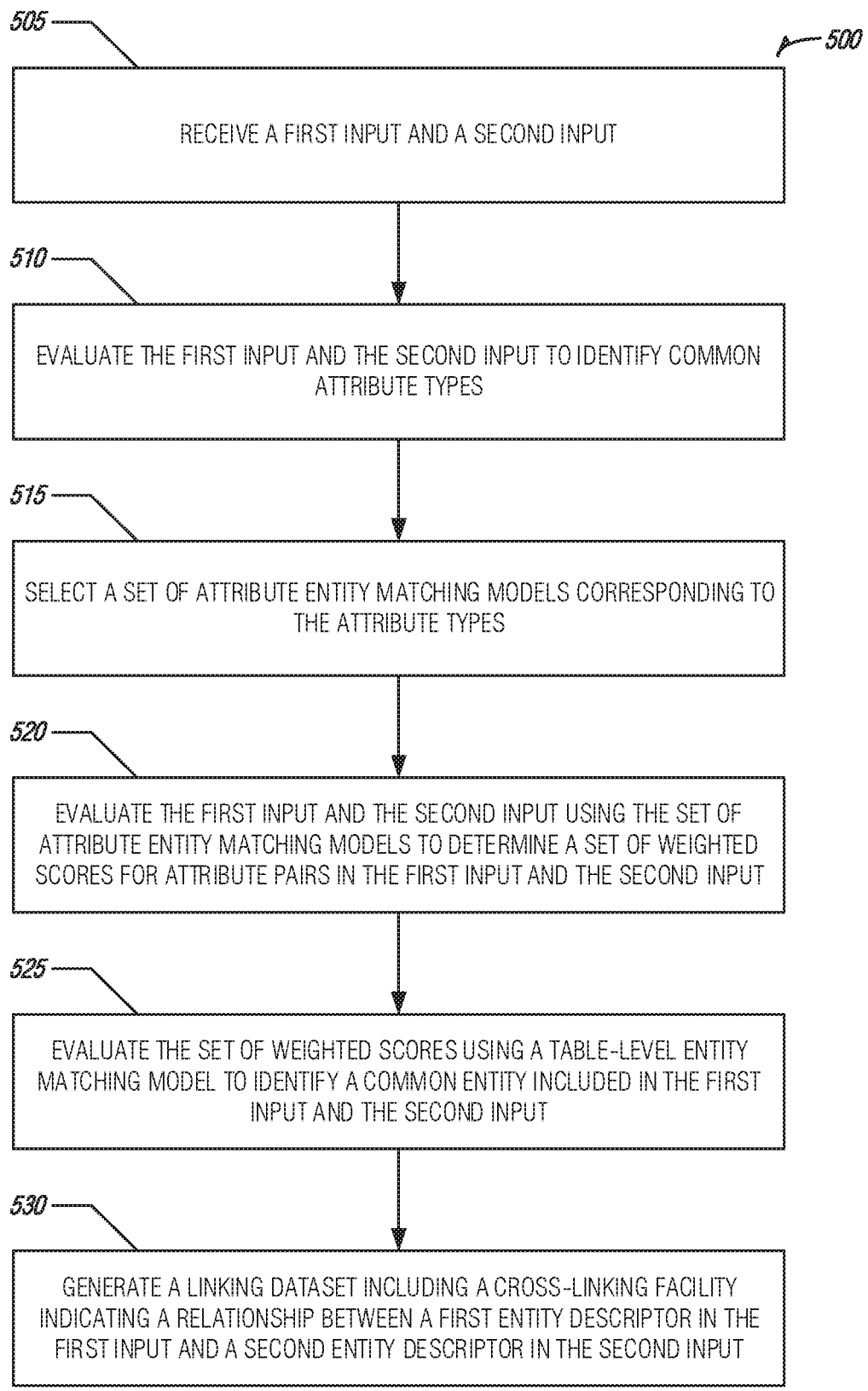
FIG. 5 illustrates an example of a method for end-to-end fuzzy entity matching, according to an embodiment.

FIG. 5 illustrates an example of a method 500 for end-to-end fuzzy entity matching, according to an embodiment. The method 500 may provide features as described in FIGS. 1-4.

A first and a second input may be received (e.g., by the input/output handler 125 as described in FIG. 1, etc.) (e.g., at operation 505). The first and second input may be evaluated (e.g., by the attribute type detector 130 as described in FIG. 1, etc.) to identify common attribute types (e.g., at operation 510). In an example, each attribute value of the first input and the second input may be processed with a hierarchical attribute-type detection model that includes a character evaluation layer and word evaluation layer. In an example, the hierarchical attribute-type detection model may include a bidirectional gated recurrent unit layer.

A set of attribute entity matching models may be selected (e.g., by the attribute-level entity matcher 135 as described in FIG. 1, etc.) that correspond to the attribute types (e.g., at operation 515). In an example, the set of attribute entity matching models may include one or more attribute-type specific attribute entity matching model. In another example, the set of attribute entity matching models may include a unified attribute entity matching model that corresponds to an unknown attribute included in the common attribute types.

The first input and the second input may be evaluated (e.g., by the attribute-level entity matcher 135 as described in FIG. 1, etc.) with the set of attribute entity matching models to determine a set of weighted scores for attribute pairs in the first input and the second input (e.g., at operation 520).

The set of weighted scores may be evaluated (e.g., by the table-level entity matcher 145 as described in FIG. 1, etc.) with a table-level entity matching model to identify a common entity included in the first input and the second input (e.g., at operation 525). In an example, a probability of a match between an entity in the first input and an entity in the second input may be calculated through use of the set of weighted scores and the common entity may be identified based on the probability of a match being outside a threshold.

In an example, a new attribute-type specific entity matching model may be generated from the unified attribute entity matching model and results of the evaluation of the set of weighted scores with the table-level entity matching model and an attribute-type detection model used to identify the common attribute types may be retrained with the new attribute-type specific entity matching model.

A linking dataset may be generated (e.g., by the input/output handler 125 as described in FIG. 1, etc.) that includes a cross-linking facility that indicates a relationship between a first entity descriptor in the first input and a second entity descriptor in the second input (e.g., at operation 530).

Figure 6:
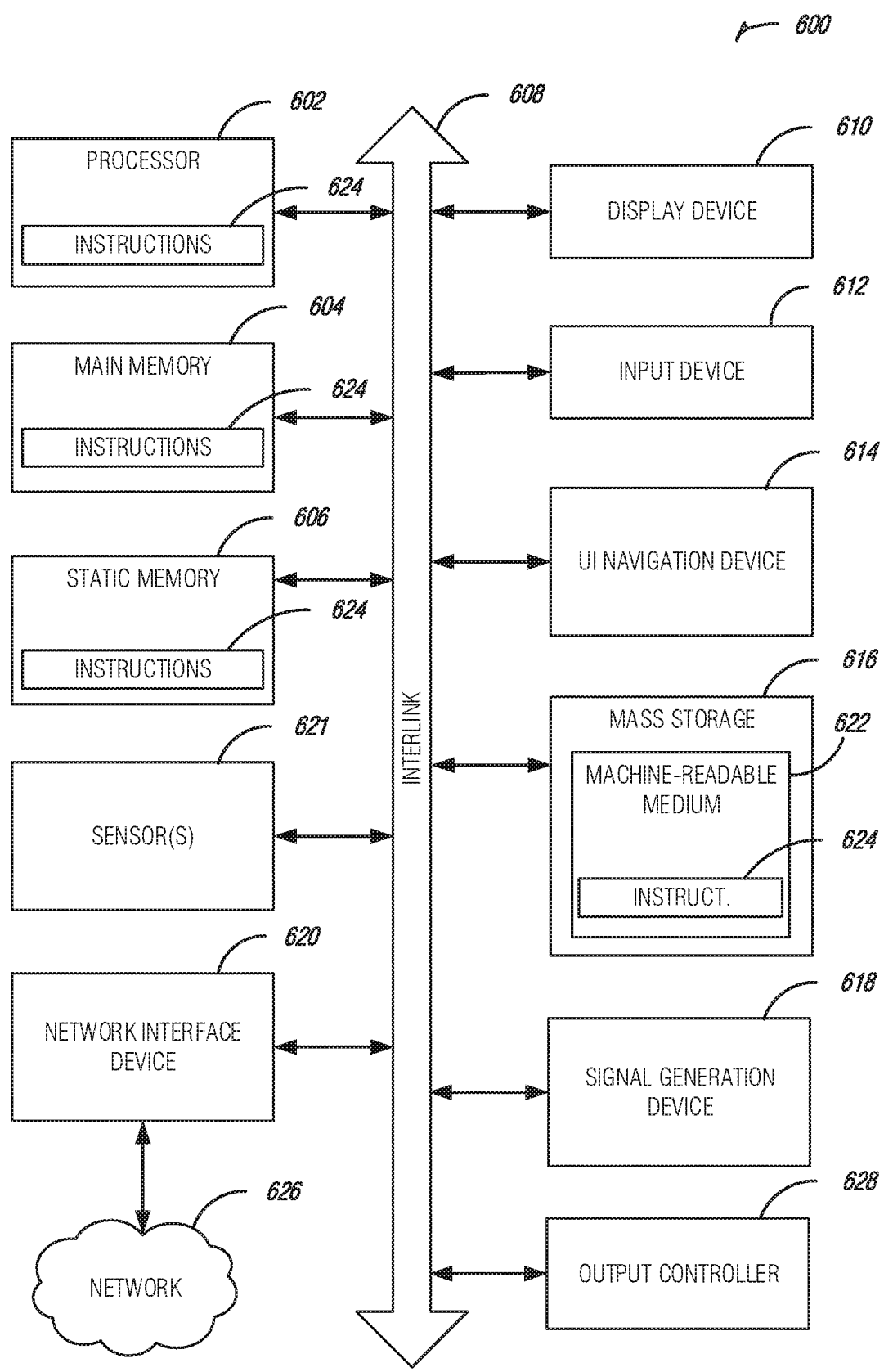
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622. on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®), IEEE 802.15.4 family of standards, peer-to-peer (P2P) networks, $3^{rd}$ Generation Partnership Project (3GPP) standards for 4G and 5G wireless communication including: 3GPP Long- Term evolution (LTE) family of standards, 3GPP LTE Advanced family of standards, 3GPP LTE Advanced Pro family of standards, 3GPP New Radio (NR) family of standards, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES & EXAMPLES

Example 1 is a system for end-to-end entity matching, the system comprising: at least one processor; and memory including instructions that, when executed by the at least one processor, cause the at least one processor to perform operations to: receive a first input and a second input; evaluate the first input and the second input to identify common attribute types; select a set of attribute entity matching models that correspond to the attribute types; evaluate the at first input and the second input with the set of attribute entity matching models to determine a set of weighted scores for attribute pairs in the first input and the second input; evaluate the set of weighted scores with a table-level entity matching model to identify a common entity included in the first input and the second input; and generate a linking dataset including a cross-linking facility that indicates a relationship between a first entity descriptor in the first input and a second entity descriptor in the second input.

In Example 2, the subject matter of Example 1 includes, wherein the instructions to evaluate the first input and the second input to identify common attribute types further comprises instructions to process each attribute value of the first input and the second input with a hierarchical attribute-type detection model that includes a character evaluation layer and word evaluation layer.

In Example 3, the subject matter of Example 2 includes, wherein the hierarchical attribute-type detection model includes a bidirectional gated recurrent unit layer.

In Example 4, the subject matter of Examples 1-3 includes, wherein the set of attribute entity matching models includes one or more attribute-type specific attribute entity matching model.

In Example 5, the subject matter of Examples 1-4 includes, wherein the set of attribute entity matching models includes a unified attribute entity matching model that corresponds to an unknown attribute included in the common attribute types.

In Example 6, the subject matter of Example 5 includes, instructions to: generate a new attribute-type specific entity matching model from the unified attribute entity matching model and results of the evaluation of the set of weighted scores with the table-level entity matching model; and retrain an attribute-type detection model used to identify the common attribute types with the new attribute-type specific entity matching model.

In Example 7, the subject matter of Examples 1-6 includes, wherein the instructions to evaluate the set of weighted scores with the table-level entity matching model to identify the common entity included in the first input and the second input further comprises instructions to: calculate a probability of a match between an entity in the first input and an entity in the second input through use of the set of weighted scores, wherein the common entity is identified based on the probability of a match being outside a threshold.

Example 8 is at least one non-transitory computer-readable storage medium including instructions for end-to-end entity matching that, when executed by at least one processor, cause the at least one processor to perform operations to: receive a first input and a second input; evaluate the first input and the second input to identify common attribute types; select a set of attribute entity matching models that correspond to the attribute types; evaluate the at first input and the second input with the set of attribute entity matching models to determine a set of weighted scores for attribute pairs in the first input and the second input; evaluate the set of weighted scores with a table-level entity matching model to identify a common entity included in the first input and the second input; and generate a linking dataset including a cross-linking facility that indicates a relationship between a first entity descriptor in the first input and a second entity descriptor in the second input.

In Example 9, the subject matter of Example 8 includes, wherein the instructions to evaluate the first input and the second input to identify common attribute types further comprises instructions to process each attribute value of the first input and the second input with a hierarchical attribute-type detection model that includes a character evaluation layer and word evaluation layer.

In Example 10, the subject matter of Example 9 includes, wherein the hierarchical attribute-type detection model includes a bidirectional gated recurrent unit layer.

In Example 11, the subject matter of Examples 8-10 includes, wherein the set of attribute entity matching models includes one or more attribute-type specific attribute entity matching model.

In Example 12, the subject matter of Examples 8-11 includes, wherein the set of attribute entity matching models includes a unified attribute entity matching model that corresponds to an unknown attribute included in the common attribute types.

In Example 13, the subject matter of Example 12 includes, instructions to: generate a new attribute-type specific entity matching model from the unified attribute entity matching model and results of the evaluation of the set of weighted scores with the table-level entity matching model; and retrain an attribute-type detection model used to identify the common attribute types with the new attribute-type specific entity matching model.

In Example 14, the subject matter of Examples 8-13 includes, wherein the instructions to evaluate the set of weighted scores with the table-level entity matching model to identify the common entity included in the first input and the second input further comprises instructions to: calculate a probability of a match between an entity in the first input and an entity in the second input through use of the set of weighted scores, wherein the common entity is identified based on the probability of a match being outside a threshold.

Example 15 is a method for end-to-end entity matching, the method comprising: receiving a first input and a second input; evaluating the first input and the second input to identify common attribute types; selecting a set of attribute entity matching models corresponding to the attribute types;

evaluating the at first input and the second input using the set of attribute entity matching models to determine a set of weighted scores for attribute pairs in the first input and the second input; evaluating the set of weighted scores using a table-level entity matching model to identify a common entity included in the first input and the second input; and generating a linking dataset including a cross-linking facility indicating a relationship between a first entity descriptor in the first input and a second entity descriptor in the second input.

In Example 16, the subject matter of Example 15 includes, wherein the evaluating the first input and the second input to identify common attribute types further comprises processing each attribute value of the first input and the second input using a hierarchical attribute-type detection model including a character evaluation layer and word evaluation layer.

In Example 17, the subject matter of Example 16 includes, wherein the hierarchical attribute-type detection model includes a bidirectional gated recurrent unit layer.

In Example 18, the subject matter of Examples 15-17 includes, wherein the set of attribute entity matching models includes one or more attribute-type specific attribute entity matching model.

In Example 19, the subject matter of Examples 15-18 includes, wherein the set of attribute entity matching models includes a unified attribute entity matching model corresponding to an unknown attribute included in the common attribute types.

In Example 20, the subject matter of Example 19 includes, generating a new attribute-type specific entity matching model using the unified attribute entity matching model and results of the evaluation of the set of weighted scores using the table-level entity matching model; and retraining an attribute-type detection model used to identify the common attribute types using the new attribute-type specific entity matching model.

In Example 21, the subject matter of Examples 15-20 includes, wherein the evaluating the set of weighted scores using the table-level entity matching model to identify the common entity included in the first input and the second input further comprises: calculating a probability of a match between an entity in the first input and an entity in the second input using the set of weighted scores, wherein the common entity is identified based on the probability of a match being outside a threshold.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is provisionally claimed is:

1. A system for end-to-end entity matching, the system comprising:
   at least one processor; and
   memory including instructions that, when executed by the at least one processor, cause the at least one processor to perform operations to:
   receive a first input and a second input;
   evaluate the first input and the second input to identify common attribute types;
   select a set of attribute entity matching machine learning models that correspond to the attribute types;
   evaluate the first input and the second input by inputting the first input and the second input into a first machine learning algorithm that applies the set of attribute entity matching machine learning models to determine a set of weighted scores for attribute pairs in the first input and the second input;

evaluate the set of weighted scores by inputting the set of weighted scores into a second machine learning algorithm that applies a table-level entity matching machine learning model to identify a common entity included in the first input and the second input;

generate a linking dataset including a cross-linking facility that indicates a relationship between a first entity descriptor in the first input and a second entity descriptor in the second input; and retrieve a record for an entity associated with the first entity descriptor using a single record retrieval request using the linking dataset.

2. The system of claim 1, wherein the instructions to evaluate the first input and the second input to identify common attribute types further comprises instructions to process each attribute value of the first input and the second input with a hierarchical attribute-type detection model that includes a character evaluation layer and word evaluation layer.

3. The system of claim 2, wherein the hierarchical attribute-type detection model includes a bidirectional gated recurrent unit layer.

4. The system of claim 1, wherein the set of attribute entity matching machine learning models includes one or more attribute-type specific attribute entity matching machine learning model.

5. The system of claim 1, wherein the set of attribute entity matching machine learning models includes a unified attribute entity matching machine learning model that corresponds to an unknown attribute included in the common attribute types.

6. The system of claim 5, further comprising instructions to:

generate a new attribute-type specific entity matching machine learning model from the unified attribute entity matching machine learning model and results of the evaluation of the set of weighted scores with the table-level entity matching machine learning model; and retrain an attribute-type detection machine learning model used to identify the common attribute types with the new attribute-type specific entity matching machine learning model.

7. The system of claim 1, wherein the instructions to evaluate the set of weighted scores with the table-level entity matching machine learning model to identify the common entity included in the first input and the second input further comprises instructions to:

calculate a probability of a match between an entity in the first input and an entity in the second input through use of the set of weighted scores, wherein the common entity is identified based on the probability of a match being outside a threshold.

8. At least one non-transitory computer-readable storage medium including instructions for end-to-end entity matching that, when executed by at least one processor, cause the at least one processor to perform operations to:

receive a first input and a second input;

evaluate the first input and the second input to identify common attribute types;

select a set of attribute entity matching machine learning models that correspond to the attribute types;

evaluate the first input and the second input by inputting the first input and the second input into a first machine learning algorithm that applies the set of attribute entity matching machine learning models to determine a set of weighted scores for attribute pairs in the first input and the second input;

evaluate the set of weighted scores by inputting the set of weighted scores into a second machine learning algorithm that applies a table-level entity matching machine learning model to identify a common entity included in the first input and the second input;

generate a linking dataset including a cross-linking facility that indicates a relationship between a first entity descriptor in the first input and a second entity descriptor in the second input; and retrieve a record for an entity associated with the first entity descriptor using a single record retrieval request using the linking dataset.

9. The at least one non-transitory computer-readable storage medium of claim 8, wherein the instructions to evaluate the first input and the second input to identify common attribute types further comprises instructions to process each attribute value of the first input and the second input with a hierarchical attribute-type detection model that includes a character evaluation layer and word evaluation layer.

10. The at least one non-transitory computer-readable storage medium of claim 9, wherein the hierarchical attribute-type detection model includes a bidirectional gated recurrent unit layer.

11. The at least one non-transitory computer-readable storage medium of claim 8, wherein the set of attribute entity matching machine learning models includes one or more attribute-type specific attribute entity matching machine learning model.

12. The at least one non-transitory computer-readable storage medium of claim 8, wherein the set of attribute entity matching machine learning models includes a unified attribute entity matching machine learning model that corresponds to an unknown attribute included in the common attribute types.

13. The at least one non-transitory computer-readable storage medium of claim 12, further comprising instructions to:

generate a new attribute-type specific entity matching machine learning model from the unified attribute entity matching machine learning model and results of the evaluation of the set of weighted scores with the table-level entity matching machine learning model; and retrain an attribute-type detection machine learning model used to identify the common attribute types with the new attribute-type specific entity matching machine learning model.

14. The at least one non-transitory computer-readable storage medium of claim 8, wherein the instructions to evaluate the set of weighted scores with the table-level entity matching machine learning model to identify the common entity included in the first input and the second input further comprises instructions to:

calculate a probability of a match between an entity in the first input and an entity in the second input through use of the set of weighted scores, wherein the common entity is identified based on the probability of a match being outside a threshold.

15. A method for end-to-end entity matching, the method comprising:

receiving a first input and a second input;

evaluating the first input and the second input to identify common attribute types;

selecting a set of attribute entity matching machine learning models corresponding to the attribute types;

evaluating the first input and the second input by inputting the first input and the second input into a first machine learning algorithm that applies the set of attribute entity matching machine learning models to determine a set of weighted scores for attribute pairs in the first input and the second input;

evaluating the set of weighted scores by inputting the set of weighted scores into a second machine learning algorithm that applies a table-level entity matching machine learning model to identify a common entity included in the first input and the second input;

generating a linking dataset including a cross-linking facility indicating a relationship between a first entity descriptor in the first input and a second entity descriptor in the second input; and retrieving a record for an entity associated with the first entity descriptor using a single record retrieval request using the linking dataset.

16. The method of claim 15, wherein the evaluating the first input and the second input to identify common attribute types further comprises processing each attribute value of the first input and the second input using a hierarchical attribute-type detection model including a character evaluation layer and word evaluation layer.

17. The method of claim 16, wherein the hierarchical attribute-type detection model includes a bidirectional gated recurrent unit layer.

18. The method of claim 15, wherein the set of attribute entity matching machine learning models includes one or more attribute-type specific attribute entity matching machine learning model.

19. The method of claim 15, wherein the set of attribute entity matching machine learning models includes a unified attribute entity matching machine learning model corresponding to an unknown attribute included in the common attribute types.

20. The method of claim 19, further comprising:

generating a new attribute-type specific entity matching machine learning model using the unified attribute entity matching machine learning model and results of the evaluation of the set of weighted scores using the table-level entity matching machine learning model; and retraining an attribute-type detection machine learning model used to identify the common attribute types using the new attribute-type specific entity matching machine learning model.

* * * * *